April 14, 1953          J. GRILLO          2,635,223
                     VOLTAGE REGULATOR
                    Filed Oct. 31, 1950
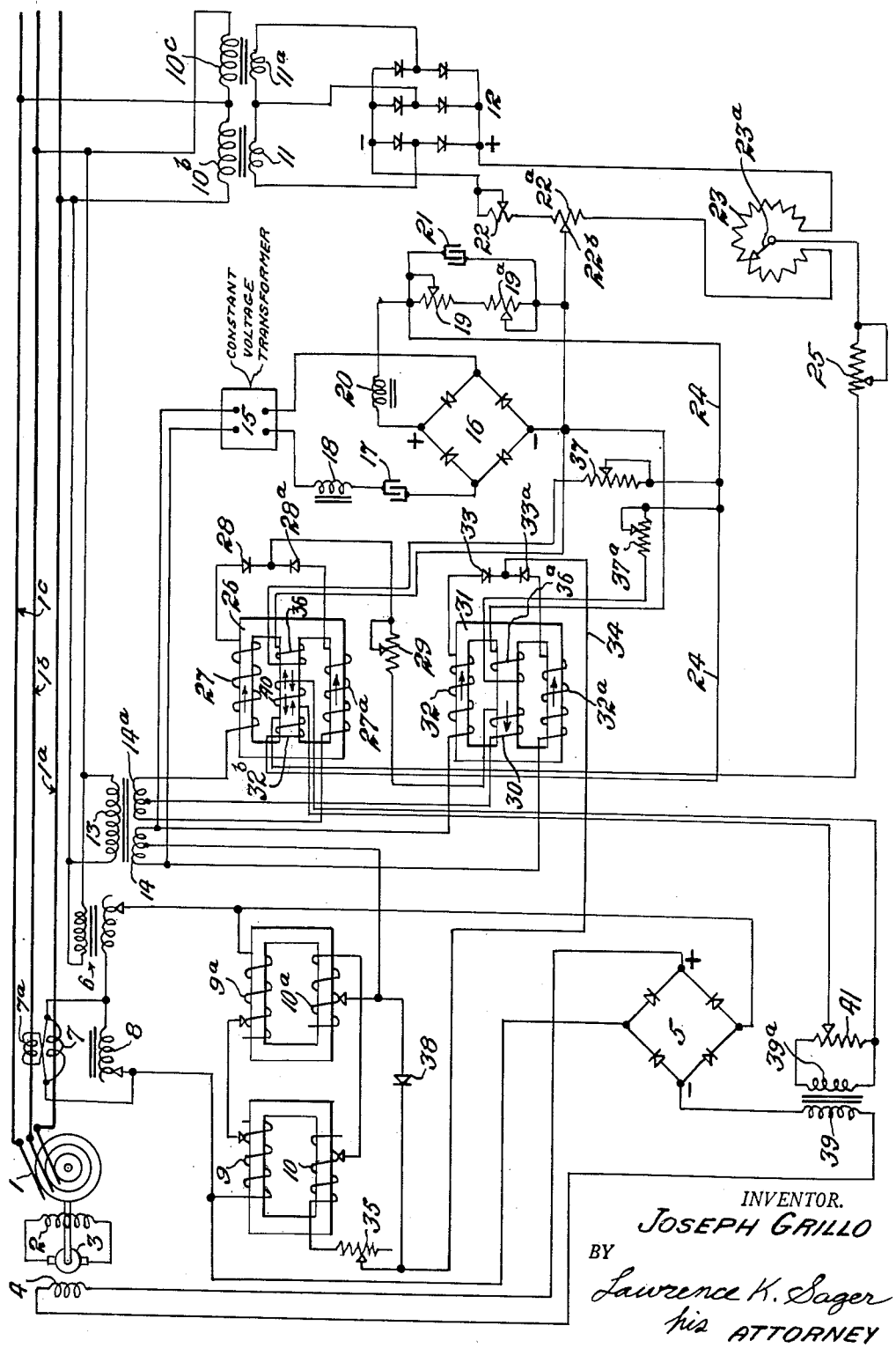
INVENTOR.
JOSEPH GRILLO
BY
Lawrence K. Sager
his ATTORNEY Patented Apr. 14, 1953

2,635,223

UNITED STATES PATENT OFFICE 2,635,223

VOLTAGE REGULATOR

Joseph Grillo, Bronx, N. Y., assignor to Ward Leonard Electric Company, a corporation of New York Application October 31, 1950, Serial No. 193,191

5 Claims. (Cl. 322—19)

This invention relates to improved voltage regulating apparatus particularly applicable to the regulation of the voltage of an alternating current generator. It is an improvement over the voltage regulating apparatus described in the J. F. Hysler Patent No. 2,396,851, granted March 19, 1946.

The main object is to regulate the voltage of the alternating current generator within close limits under changes of the load, the power factor and voltage. A further object is to produce a pronounced control of the generator voltage in response to small changes in the voltage of the line circuit and to very considerably amplify any change of the voltage of the line circuit in order to quickly and effectively raise or lower the voltage of the generator for maintaining the desired voltage of the generator. Another object is to provide effective means for overcoming hunting or undesirable over-correction of the generator voltage. A general object is to accomplish the foregoing by static electromagnetic controlling apparatus which insures dependability under long continued use and avoids the necessity of repairs or replacements such as are required when movable controlling parts or tubes are used. These and other objects and advantages will be understood from the following description and accompanying drawing which illustrates the application of the invention to the control of a three-phase alternating current generator as one embodiment, although the invention is likewise applicable to single phase and other systems.

The accompanying drawing is a diagram showing the various parts of the apparatus and their connections for automatic regulation of the generator. The apparatus may also include control switches for changing from automatic control to manual control and from manual control to automatic control, but as such changeability forms no part of the present improvement, the changeover switches are omitted for simplicity of disclosure.

A three-phase generator 1 is shown supplying the lines 1a, 1b and 1c. Its field winding 2 is shown supplied by a separate exciter 3 having a field winding 4. The main generator field winding may be directly controlled by the regulating apparatus and the separate exciter omitted provided an auxiliary source is used for initially exciting the generator field in starting. In such a case the auxiliary source would be disconnected when the generator voltage attained a predetermined value.

The power supply for controlling the excitation of the generator is derived from a rectifier 5 shown of the bridge-connected dry disk type. This supplies the field of the exciter which in turn excites the field of the generator. The rectifier receives its energy from a voltage transformer 6 having its primary connected across a pair of the supply lines. A pair of reversely connected current transformers having secondaries 7 and 7a are shown related to the supply lines 1a and 1b and are shunted by a reactor 8 and are connected in series with the secondary of the voltage transformer 6. This combination gives an output dependent upon the change of voltage of the supply lines, the load and the power factor, as disclosed in said Hysler patent, and serves to effect most of the required correction in the generator voltage; but as this connection is only approximate, close regulation is obtained by highly sensitive means as later explained.

The main windings 9 and 9a of a pair of reactors, shown as having rectangular cores in this instance, are connected across or in shunt to the output of the current and voltage transformers. These reactors also have controlling windings 10 and 10a respectively, supplied with current which changes in a pronounced degree upon slight changes in the voltage of the supply lines.

This pronounced change is obtained by relating the voltage change in the supply lines to a fixed voltage and by then amplifying their change in relationship. The voltage variable with that of the supply lines is derived from a pair of transformers having primary windings 10b and 10c and secondary windings 11 and 11a. The primary winding 10b is connected across the lines 1a and 1c and the primary 10c is connected across the lines 1b and 1c. Three pairs of full wave dry disk type rectifiers 12 have their positive terminals connected together and their negative terminals connected together. The three intermediate connections thereof are connected respectively to the outside terminals of the secondaries 11 and 11a and to the connection between them. Thus the direct current voltage of the output of the rectifiers 12 reflects the change in the composite voltage of the three supply lines.

Another transformer has its primary winding 13 connected across a pair of the supply lines and has two secondary windings 14 and 14a. A constant voltage transformer 15 has its primary connected across the terminals of the secondary winding 14. Various types of constant voltage transformers are commercially available. The output therefrom is supplied to a rectifier 16 shown of the bridge-connected dry disk type. In series in one of the lines from the transformer to the rectifier are connected a capacitor 17 and a reactor 18, the latter having an air-gap in its core. They serve to compensate for any change in frequency of the current supplied by the main generator 1. The output of the rectifier 16 is maintained at a constant voltage by being supplied from the constant voltage transformer 15 and is impressed upon adjustable resistors 19 and 19a which are connected in series across the terminals of the rectifier 16 through a reactor 20. The resistors are shunted by a capacitor 21. The reactor 20 and capacitor 21 serve as filters in the output circuit of the rectifier. The adjustment of the resistors 19 and 19a serve to bring the fixed potentials at their terminals to the desired operating level.

The output of the rectifiers 12 which varies according to any change in the voltage of the supply lines, is impressed upon adjustable resistors 22 and 22a and a control rheostat 23, all connected in series with each other across the terminals of the rectifiers 12. The contact arm 23a of the rheostat serves to adjust the voltage of the supply lines at a desired value to be maintained by the automatic control and in cooperation with the adjustment of the resistors 22 and 22a serve to bring the potentials of the contact arm 23a and adjustable contact 22b of resistor 22a in desired relationship to the fixed potentials of the output circuit of the rectifier 16. The negative terminal of the rectifier 16 is connected to the negative side of the rectifiers 12 at the contact 22b. The positive side of the rectifier 16 is connected by line 24 through a control winding, later explained, to the positive side of rectifiers 12 through an adjustable resistor 25 and contact arm 23a of the control rheostat. In this manner the voltages derived from the rectifiers 16 and 12 are connected in opposition to each other through a control winding. When these opposed voltages are equal, no current passes in the control winding but when one exceeds the other, current will pass through the control winding in one direction or in an opposite direction depending upon which voltage is the greater.

The change in current supplied to the control winding is greatly amplified by magnetic amplifiers now to be described. In the present disclosure two stages of amplification are utilized although more may be used if desired and in sime cases one stage may be sufficient. The first stage is shown as a reactor having a three-legged core 26 with anode windings 27 and 27a on the outside legs. These windings are connected respectively to the terminals of the secondary transformer winding 14 and to half-wave dry disk type rectifiers 28 and 28a. A connection from between these rectifiers passes through an adjustable resistor 29 to a control winding 30 on the core 31 of the second stage and thence to a mid-connection of the secondary 14a. A control winding 32b on the middle leg of the core of the first stage is connected in circuit from the positive side of the rectifier 16 to the positive side of the rectifiers 12 by the connection 24 through the control winding 32b and resistor 25 to the contact arm of the rheostat 23. When the changeable voltage imposed on this circuit by the rectifier 12 exceeds the fixed voltage imposed thereon by the rectifier 16, current will flow in one direction through the control winding; and when the voltage imposed by the rectifier 12 is less, current will pass in the opposite direction through the control winding.

Anode windings 32 and 32a are shown on the outside legs of the three-legged core 31 of the second stage. Their terminals are connected respectively to the outside terminals of the secondary winding 14 and to two half-wave dry disk rectifiers 33 and 33a. A connection 34 from between these rectifiers passes through an adjustable resistor 35 and through the windings 10 and 10a which serve as control windings for their reactors.

Biasing windings 36 and 36a are located respectively on the middle legs of the magnetic amplifier cores. They are supplied with direct current of a constant value from the rectifier 16 by connections from the negative side of the rectifier through the windings in parallel and then through adjustable resistors 37 and 37a respectively back to the positive side of the rectifier. The output of the anode windings of the two stages varies widely over a wide range upon change of current in their control windings. The currents supplied to the biasing windings are adjusted by the resistors 37 and 37a to such values with the proper direction of current as to cause the normal output of the anode windings to be at about the middle portion of this wide range of change in value of the output of the anode windings when no current passes in the control winding 32b of the first stage. It follows that changes in the value and direction of the current in the control winding 32b will produce pronounced changes in the output of the anode windings 27 and 27a which results in pronounced increases and decreases in the current supplied to the control winding 30 of the second stage. This, of course, greatly amplifies the change in output of the anode windings 32 and 32a of the second stage.

Now referring to the reactors having the alternating current supply windings 9 and 9a and the control windings 10 and 10a, a half-wave dry disk type rectifier 38 is connected across the control windings 10 and 10a. The current from the anode windings 32 and 32a of the second stage of amplification cannot pass through the one-way valve 38 and therefore passes through the control windings 10 and 10a. However, the latter windings function as secondaries in relation to the windings 9 and 9a; and the valve 38 serves as a discharge path to permit the amplified control current in the windings 10 and 10a to operate most effectively. The resistor 35 serves to adjust the time constant of the discharge through the valve. The winding 10a is connected in reverse relation to winding 9a from that of winding 10 to winding 9. This results in a more uniform direct current in the windings 10 and 10a because the electromotive forces induced in these windings by the alternating current in the windings 9 and 9a are more balanced in their resultant effect on the direct current in the windings 10 and 10a than would otherwise be the case.

The close regulation in this type of control is so sensitive that anti-hunting means is provided to dampen the effects of the pronounced change in control. For this purpose the primary 39 of a transformer is connected in series with the field winding 4 of the exciter in the output circuit of the rectifier 5. The secondary 39a of this transformer supplies current to a control winding 40 on the middle leg of the core 26 of the first amplifying stage. One terminal of the winding 40 is connected to the movable contact of an adjustable resistor 41 connected across the terminals of the secondary winding 39a for adjusting the value of the anti-hunt control. When the current increases or decreases in the exciter field winding by the action of the regulator, an electromotive force is induced in the secondary winding 39a of an amount and in a direction depending upon the change in the primary 39. The current due to such impulse is passed through the control winding 40. And this winding is connected in its circuit so that its magnetomotive force will oppose the change of the magnetomotive force of the control winding 32b. It thereby dampens the change and avoids over-correction changes.

The operation may now be described. The main regulation, as already described, is obtained for changes in load, power factor and voltage by the current transformers 7 and 7a, the voltage transformer 6 and their connections to the rectifier 5 and then to the field winding 4 of the exciter. The close regulation of the voltage will be understood by first considering a rise in voltage above the normal value. This increases the output voltage of the rectifiers 12 which increases the voltage between the contact 22b and the contact arm 23a which voltage is in opposition to the fixed voltage of the output circuit of the rectifier 16. This causes a current to pass from the positive terminal of rectifier 12 to the contact arm 23a, then through resistor 25 and through the control winding 32b in a direction so that its magnetomotive force is additive to that of the anode windings 27 and 27a as indicated by the direction of the arrows on the anode windings and the upper arrow on the control winding 32b. The current from the control winding returns to the positive side of the rectifier 16 by the connection 24. The effect of this current in the control winding 32b is to reduce the reactance of the anode windings which permits more current to pass therefrom to the control winding 30 of the second stage. Its magnetomotive force is additive to that of the anode windings 32 and 32a, as indicated by the direction of the arrows. Thus the reactance of these anode windings is reduced which permits an increased current to pass therefrom to the control windings 10 and 10a of the two reactors. This decreases the reactance of the windings 9 and 9a and permits more current to pass through them and thereby shunts more current away from the current supplied to the rectifier 5. It thereby reduces the current supplied by this rectifier to the field winding of the exciter which in turn reduces the voltage of the generator 1 and of the supply lines. The reduction of current in the rectifier circuit causes an electromotive force to be induced in the anti-hunt winding 40, as already explained, and its magnetomotive force is then in a direction to oppose the magnetomotive force of the anode windings 27 and 27a, as indicated by the upper arrow on winding 40, and thereby dampens the corrective effect due to the control winding 32b. When the voltage of the supply lines falls below normal, the reverse action takes place as will be understood from the foregoing description.

Although a particular form of cores and location of windings thereon has been described, various other forms and relationship of windings thereto and of their connections may be made for obtaining similar modes of operation. In case only one stage of amplification is used the output of the anode windings of the first stage shown would be connected to the circuit of the control windings 10 and 10a. Various other modifications may be made without departing from the scope of the invention.

I claim:

1. A regulator for an alternating current generator having a field winding comprising a reactor having an anode winding supplied from the output of the generator and also having a control winding, a source having a fixed output voltage, a rectifier deriving its energy from the output of the generator and subject to change in voltage of the generator output, connections between said rectifier and said source for placing their voltages in opposition to each other, said control winding being connected in the circuit between said opposed voltages, a bridge rectifier connected between the output of said generator and the field winding to provide the winding with a direct field energization current, saturable reactors for controlling the current supplied to the bridge rectifier each having anode windings connected in series and control windings connected in series, said series anode windings connected across the input of said bridge rectifier to shunt the current delivered to the bridge rectifier, said series control windings being connected to the anode windings to receive the difference between said opposition voltages to control the field excitation of the generator and a half wave rectifier connected in shunt to said control windings.

2. A regulator for an alternating current generator comprising a reactor having an anode winding supplied from the output of the generator and also having a control winding, a constant voltage transformer supplied with energy derived from the output of the generator, a rectifier supplied with current from said transformer, a second rectifier supplied with current derived from the output of the generator and subject to change in voltage of the generator output, connections between said rectifiers for placing their voltages in opposition to each other, said control winding being connected in the circuit between said opposed voltages, a bridge rectifier connected between the output of said generator and the field winding to provide the winding with a direct field energization current, saturable reactors for controlling the current supplied to the bridge rectifier each having anode windings connected in series and control windings connected in series, said series anode windings connected across the input of said bridge rectifier to shunt the current delivered to the bridge rectifier, said series control windings being connected to the anode windings to receive the difference between said opposition voltages to control the field excitation of the generator and a half wave rectifier connected in shunt to said control windings.

3. A regulator for an alternating current generator comprising a reactor having an anode winding supplied from the output of the generator and also having a control winding, a constant voltage transformer supplied with energy derived from the output of the generator, a rectifier supplied with current from said transformer, a reactor and capacitor connected in series with each other in the circuit between said transformer and said rectifier for compensating for change in frequency of the output of the generator, a second rectifier supplied with current derived from the output of the generator and subject to change in voltage of the generator output, connections between said rectifiers for placing their voltages in opposition to each other, said control winding being connected in the circuit between said opposed voltages, a bridge rectifier connected between the output of said generator and the field winding to provide the winding with a direct field energization current, saturable reactors for controlling the current supplied to the bridge rectifier each having anode windings connected in series and control windings connected in series, said series anode windings connected across the input of said bridge rectifier to shunt the current delivered to the bridge rectifier, said series control windings being connected to the anode windings to receive the difference between said opposition voltages to control the field excitation of the generator and a half wave rectifier connected in shunt to said control windings.

4. A regulator for an alternating current generator comprising a current transformer supplied with energy derived from the output of the generator, a voltage transformer supplied with energy derived from the output of the generator and subjected to changes in voltage of the output of the generator, said transformers having their secondaries connected in series with each other, a reactor having a winding connected in the output circuit of said secondaries and subjected to alternating current therefrom, a rectifier supplied with current from said winding, the output of said rectifier supplying current to control the field excitation of the generator, a magnetic amplifier having an anode winding on its core supplied with current from the output of the generator and also having a control winding, said control winding being supplied with direct current derived from the output of the generator and subjected to change in voltage of the output of the generator, a control winding on said reactor, and connections from said anode winding to said last named control winding for supplying direct current thereto in response to change in voltage of the generator.

5. A regulator for an alternating current generator comprising a current transformer supplied with energy derived from the output of the generator, a voltage transformer supplied with energy derived from the output of the generator and subjected to changes in voltage of the output of the generator, said transformers having their secondaries connected in series with each other, a reactor having a winding connected in the output circuit of said secondaries and subjected to alternating current therefrom, a rectifier supplied with current from said secondaries and in shunt with said winding, the output of said rectifier supplying current to control the field excitation of the generator, a magnetic amplifier having an anode winding on its core supplied with current from the output of the generator and also having a control winding, said control winding being supplied with direct current derived from the output of the generator and subjected to change in voltage of the output of the generator, a control winding on said reactor, and connections from said anode winding to said last named control winding for supplying direct current thereto in response to change in voltage of the generator, and a half-wave rectifier connected in shunt to said last named control winding.

JOSEPH GRILLO.

References Cited in the file of this patent

UNITED STATES PATENTS

| Number | Name | Date |
|---|---|---|
| 1,985,004 | West | Dec. 18, 1934 |
| 2,012,588 | Logan | Aug. 27, 1935 |
| 2,396,851 | Hyslem | Mar. 19, 1946 |
| 2,429,724 | Krabbe | Oct. 28, 1947 |
| 2,525,451 | Graves | Oct. 10, 1950 |
| 2,526,133 | Haas | Oct. 17, 1950 |